(No Model.) 2 Sheets—Sheet 1.
J. C. McCORMICK.
SEED PLANTING MACHINE.
No. 579,165. Patented Mar. 23, 1897.
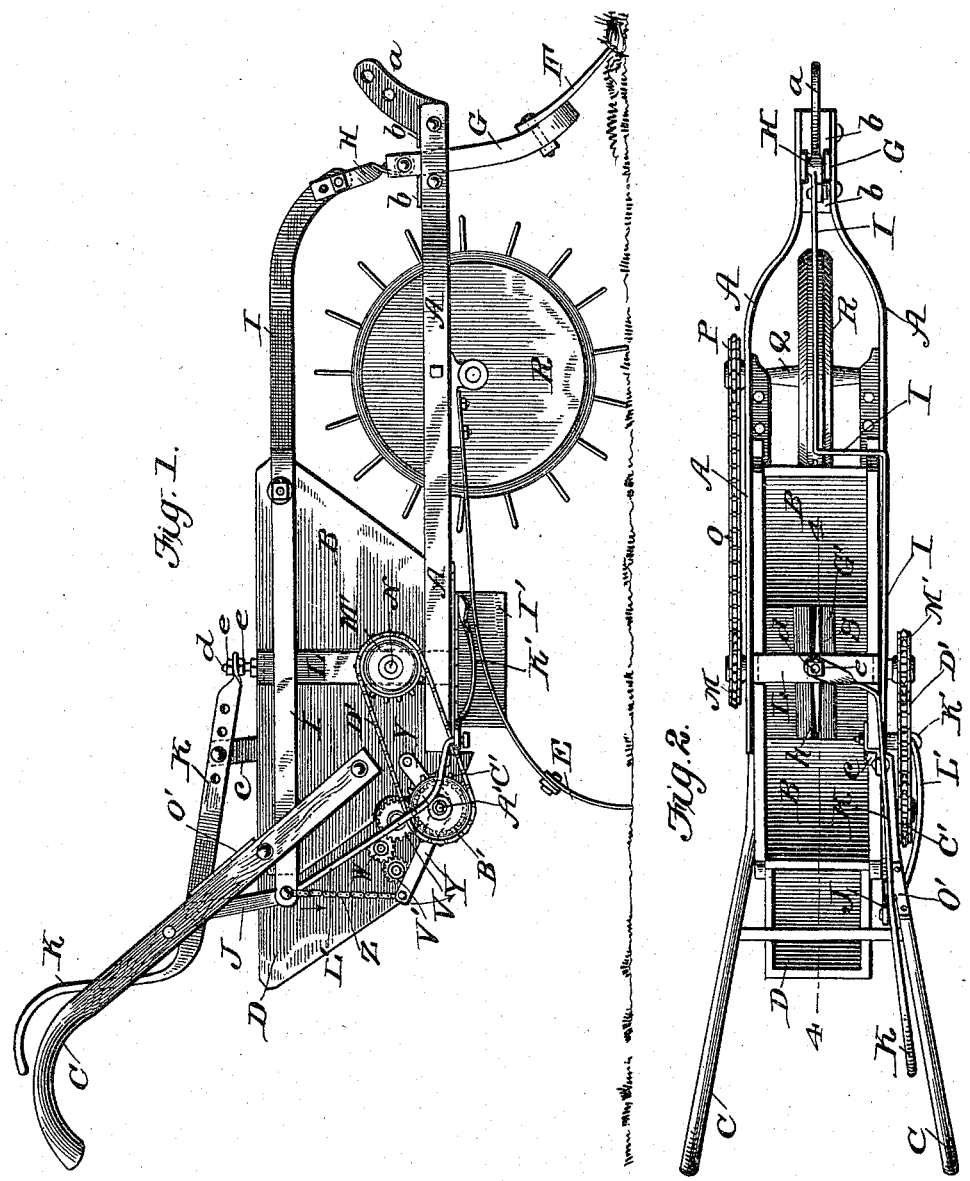
WITNESSES:
Jos. A. Ryan
Amos W Hart
INVENTOR
James C. McCormick
BY Munn & Co.
ATTORNEYS.

(No Model.) 2 Sheets—Sheet 2.
J. C. McCORMICK.
SEED PLANTING MACHINE.
No. 579,165. Patented Mar. 23, 1897.
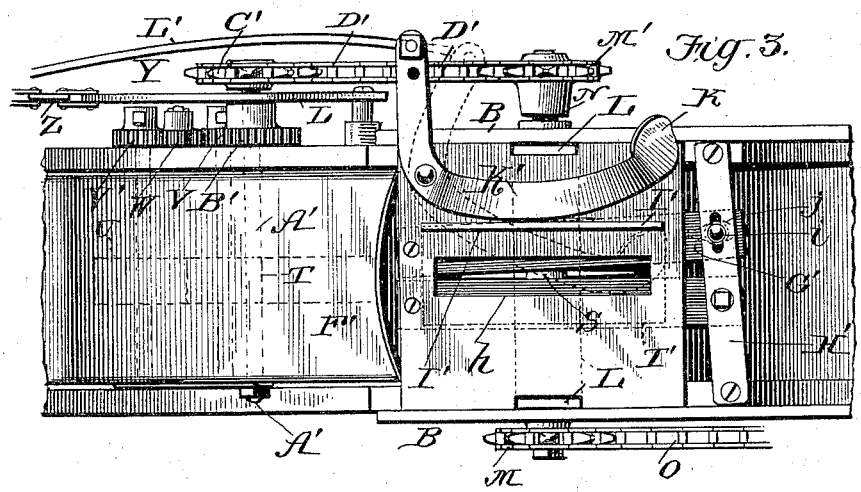
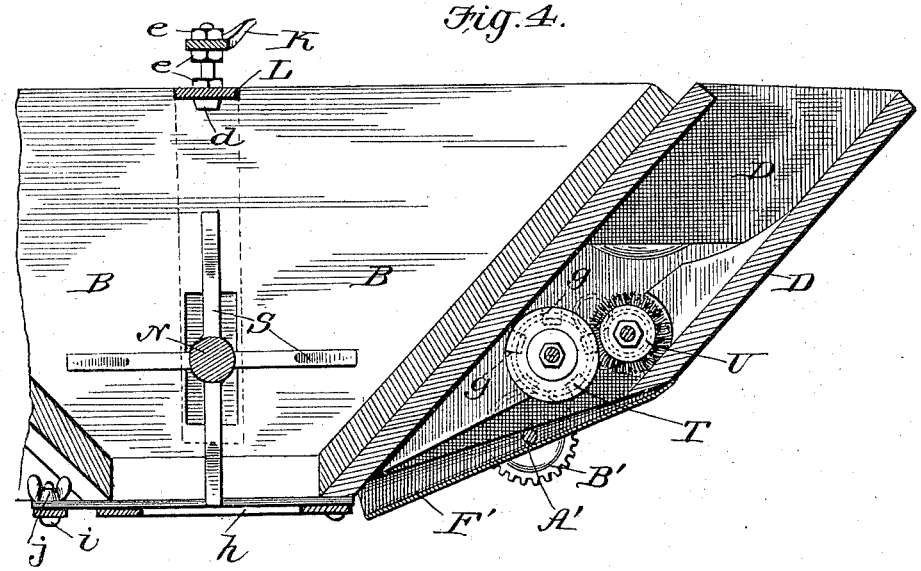
WITNESSES:
Jos. A. Ryan
Amos W Hart
INVENTOR
James C. McCormick.
BY Munn & Co.
ATTORNEYS.

UNITED STATES PATENT OFFICE.

JAMES C. McCORMICK, OF FINDLAY, GEORGIA, ASSIGNOR OF TWO-THIRDS TO JOHN B. McDONALD AND P. G. McDONALD, OF DOOLY COUNTY, GEORGIA.

SEED-PLANTING MACHINE.

SPECIFICATION forming part of Letters Patent No. 579,165, dated March 23, 1897.

Application filed September 21, 1894. Serial No. 523,694. (No model.)

*To all whom it may concern:*

Be it known that I, JAMES C. McCORMICK, of Findlay, in the county of Dooly and State of Georgia, have invented a new and useful Improvement in Seed-Planters, of which the following is a specification.

The construction and arrangement of parts are as hereinafter described and claimed.

In the accompanying drawings, Figure 1 is a side view of my improved planter. Fig. 2 is a top plan view of the same. Fig. 3, Sheet 2, is a bottom plan view of the body of the machine. Fig. 4 is a central longitudinal section on line 4 4 of Fig. 2.

The body of my machine is similar to that of the standard-planter. That is to say, it has a horizontal bifurcated frame A, having a draft attachment $a$ at the front end, a large hopper B, secured between the rear ends of such frame A and provided with inclined handles C, a smaller grain-hopper D, which is attached to the inclined rear end of the larger hopper, and curved spring furrow-closers or seed-coverers E.

The plow or furrow-opener F is attached to a standard G, that is adapted to slide vertically in a slotted block $b$, secured between the front ends of the frame A. Said standard G is adjustably connected, by means of a link H, with an angular lever I, Figs. 1 and 2, that extends alongside the large hopper B and is fulcrumed at the front upper corner of the latter. This lever I is thus adapted to be vibrated vertically to raise or lower the plow F, and for this purpose said lever is connected by a bar or rigid link J, Fig. 1, with a hand-lever K, which is pivoted on a rigid support $c$ and extends rearward and is curved upward into proximity to one of the handles C of the planter proper. It is apparent that by shifting the rear or handle end of the hand-lever K down or up the plow-lever I will be correspondingly shifted up or down at its front end, so as to force the plow F into the soil or take it out of the same.

It will be seen from Figs. 1 and 2 that since the fulcrum-support $c$ of the hand-lever K is pivoted to the side of the hopper B and the plow-elevating lever I has a series of perforations the fulcrum or pivotal point may be shifted as conditions require. The angular front end of said hand-lever K is adjustably connected by a screw $d$ and nuts $e$, Fig. 4, with a stirrup-like device L, whose parallel pendent arms are slidable vertically in guide-grooves formed in the outer sides of the larger hopper B. Two small chain-wheels or sprockets M M' are mounted on the ends of a shaft N, that passes transversely through the hopper B and the arms of the slidable elevating device L. One, M, of these sprockets is driven by an endless chain O, that runs on a sprocket P, Fig. 2, mounted on the shaft Q of the large spiked traveling or motor wheel R, arranged in front of the hopper B. On the aforesaid shaft N within the hopper B is mounted a toothed wheel S, that serves to cause discharge of seed or guano. It is apparent that when the hand-lever K is shifted up or down the stirrup-like device L and the discharge-wheel S will be correspondingly lowered or raised and that this movement is effected simultaneously with the adjustment of the plow or furrow-opener F, as before described.

By adjusting the set-nuts $e$ on the screw $d$ the connection between the hand-lever K and elevating device L may be placed higher or lower, as desired.

The grain-discharger in the rear hopper D is a rotatable roll or disk T, having a series of peripheral grain-pockets $g$. In rear of disk T is arranged a rotatable brush-cylinder U, which works in frictional contact with the seed-disk T and prevents escape of chaff and any grain save such as the pockets $g$ contain. On the outer side of the grain-hopper D, Fig. 1, small gears V V' are shown mounted on the shafts of said grain-disk and brush-cylinder, respectively, and a third gear W meshes with both V and V', so that they rotate in the same direction, as shown by arrows, Fig. 1. The grain-disk T and brush U may be thrown into or out of action by means of a shiftable gear B', Fig. 1, and a chain-sprocket and lever mechanism to be now described.

The curved or elbow lever Y, Fig. 1, is pivoted at its forward end to the side of hopper B, and its free rear end is connected by a chain Z with the rear end of the plow-elevating lever I. A shaft A', Fig. 3, arranged at the bottom of the grain-hopper B and pivoted at one end, passes through a gear B', also through said elbow-lever Y and the sprocket C', from which a chain D' runs to the like sprocket M' on the adjacent arm of the elevating device L. It will now be apparent that when the hand-lever K is raised the elbow-lever Y will carry the gear B' into engagement with the gear V on the grain-disk shaft, and that thus rotation will be imparted to the disk and brush from the spiked motor-wheel R through the intermediaries described. It is further apparent that when the hand-lever K is dropped or lowered the gear B' will be disengaged (by gravity) from the gear V and the grain-discharge thus cut off. The grain is delivered into a forwardly-projecting spout F'. The larger hopper B has a lengthwise slit, Fig. 3, in the bottom, which may be widened or narrowed by adjustment of a bar G', that forms one of its sides, said bar G' being pivoted at one end and provided at the other end with a clamp-bolt $i$ and nut $j$ for securing it in different adjustments. For this purpose the bolt $i$ passes through a slot in a bar H', as shown.

A valve I', Fig. 3, in the form of a flat rectangular plate is hinged to the bottom of the hopper B, and when in horizontal position it closes the discharge-openings $h$ of the hopper. The means I employ for holding it thus closed is a horizontal elbow-lever K', which is pivoted at its angle to the bottom of the hopper B and connected by a rigid link or rod L' with the rear end of the plow-elevating lever I. The free end of this elbow-lever K' is bent or curved downward in such manner as to adapt it to slide easily over the valve I' for raising and thereby closing it, so as to prevent escape of the contents of the hopper. When the latter is discharging, the valve I' hangs vertical, as shown by full lines, Fig. 1.

Thus from the foregoing description it will be perceived that four distinct operations and results are simultaneously produced by adjustment of the hand-lever—that is to say, when the latter is raised at its rear end the plow or furrow-opener is pushed down into the soil, the toothed discharge-wheel is lowered in the hopper, the discharge-valve of the latter is opened, and the grain-discharge disk and brush are rotated, and, contrariwise, when the hand-lever is lowered the plow and spiked wheel are raised, the valve closed, and the grain-disk thrown out of action, in which condition the planter is adapted to be transported or to run around stumps, &c., or to turn at ends of a field or to run from one field to another.

As shown in Fig. 2, a stop or fixed catch O' is attached to one of the handles C, and the hand-lever I may be locked with it, above or below, for holding the lever in either of the two positions above described.

What I claim is—

1. In a planter, the combination with the plow, or furrow-opener, the discharge-wheel within the hopper, the discharge-valve, for the latter, and the grain-discharge disk, of mechanism for adjusting said furrow-opener, wheel, and valve, substantially as shown and described.

2. In a planter, the combination, with the hopper, and the valve hinged exteriorly to the bottom of the same, of the elbow-lever K', pivoted adjacent to said valve and adapted to swing horizontally so that its free end may slide on the valve, and supplemental lever mechanism, adapted to be operated manually, for actuating such valve-lever, as shown and described.

3. In a planter, the combination, with the hopper and frame, of the slidable furrow-opener standard, adapted to slide in said frame, the lever I, loosely connected with said standard and extending rearward, the stirrup L, adapted to slide vertically in the hopper, the discharge-wheel arranged in the latter for adjusting said wheel, a hand-lever connected with the stirrup and also with the aforesaid lever I, as shown and described, whereby the furrow-opener and discharge-wheel are adjusted simultaneously into or out of work, as specified.

4. In a planter, the combination with the spiked motor-wheel, the two hoppers, having a discharge wheel and valve, and grain-disk and brush-wheel, respectively, of the slidable elevating device, the elbow-lever for closing the valve, gearing for actuating the grain-disk and brush, for connecting chains and sprockets, as specified, with the motor-wheel, and mechanism for throwing such gearing into action, as shown and described.

5. In a planter, the combination with a hopper and spiked motor-wheel, a toothed discharge-wheel in the hopper, a chain-and-sprocket connection between such wheels, a slidable device for elevating the toothed wheel, a pivoted hand-lever connected with such device, a discharge-valve, a lever for closing it, and means for connecting such lever with said hand-lever, as shown and described.

J. C. McCORMICK.

Witnesses:
J. FRANK PONCEL,
RUSSEL KILLAM.